(12) United States Patent
Butz

(10) Patent No.: US 7,458,181 B2
(45) Date of Patent: Dec. 2, 2008

(54) WATERFOWL DECOY KITE

(75) Inventor: Scott Butz, Argusville, ND (US)

(73) Assignee: Reel Wings Decoy Co. Inc., Fargo, ND (US)

( * ) Notice: Subject to any disclaimer, the term of this patent is extended or adjusted under 35 U.S.C. 154(b) by 0 days.

(21) Appl. No.: 11/313,582

(22) Filed: Dec. 20, 2005

(65) Prior Publication Data

US 2007/0137092 A1 Jun. 21, 2007

(51) Int. Cl.
*A01M 31/06* (2006.01)
*A63H 27/08* (2006.01)
*B64C 31/06* (2006.01)

(52) U.S. Cl. ...................... 43/3; 244/153 A; 244/155 A

(58) Field of Classification Search ............. 244/155 R, 244/153 A, 153 R, 155 A, 154; 43/3, 2, 1; D21/445, 446
See application file for complete search history.

(56) References Cited

U.S. PATENT DOCUMENTS

| | | | | |
|---|---|---|---|---|
| 72,855 A * | 12/1867 | Hughes | ................ | 244/153 R |
| 244,038 A * | 7/1881 | Danz, Jr. | ................ | 43/3 |
| 282,851 A * | 8/1883 | Danz, Jr. | ................ | 43/3 |
| 311,877 A * | 2/1885 | Danz, Jr. | ................ | 43/3 |
| 575,283 A * | 1/1897 | Frantz | ................ | 43/3 |
| 671,865 A * | 4/1901 | Mowrer | ................ | 244/153 R |
| 722,682 A * | 3/1903 | Dills | ................ | 43/3 |
| 743,301 A * | 11/1903 | Lischtiak | ................ | 244/153 R |
| 883,161 A * | 3/1908 | Rosentreter | ................ | 43/3 |
| 942,103 A * | 12/1909 | Rigney | ................ | 43/2 |
| 977,787 A * | 12/1910 | Davis | ................ | 43/3 |
| 997,455 A * | 7/1911 | Lischtiak | ................ | 244/153 R |
| 1,189,206 A * | 6/1916 | Moreira | ................ | 244/153 R |
| 1,473,612 A * | 11/1923 | Dewey | ................ | 43/3 |
| 2,151,349 A * | 3/1939 | Fromme | ................ | 244/153 A |
| 2,341,028 A * | 2/1944 | Fay | ................ | 43/3 |
| 2,434,077 A * | 1/1948 | Lang | ................ | 244/153 R |
| 2,442,417 A * | 6/1948 | Lang | ................ | 244/153 R |
| 2,507,777 A * | 5/1950 | Frey | ................ | 244/153 R |
| D160,910 S * | 11/1950 | Wolford | ................ | 244/153 A |
| 2,536,338 A * | 1/1951 | Withey et al. | ................ | 43/3 |
| 2,566,029 A * | 8/1951 | Louthan | ................ | 43/43.13 |
| 2,762,590 A * | 9/1956 | Huie | ................ | 244/153 R |
| 2,763,952 A * | 9/1956 | Bruce | ................ | 43/3 |
| 2,768,803 A * | 10/1956 | Smith | ................ | 244/153 R |
| 2,783,572 A * | 3/1957 | Rohan | ................ | 43/3 |
| 2,793,829 A * | 5/1957 | Brumfield | ................ | 244/153 A |
| 2,903,207 A * | 9/1959 | Wilson | ................ | 244/153 R |
| 2,941,765 A * | 6/1960 | Feldman | ................ | 244/153 R |
| 3,022,966 A * | 2/1962 | Briggs | ................ | 244/154 |
| 3,026,073 A * | 3/1962 | Albertson, Jr. | ................ | 244/153 A |
| 3,044,208 A * | 7/1962 | Minera | ................ | 43/43.13 |

(Continued)

FOREIGN PATENT DOCUMENTS

DE 4006737 A1 * 10/1990

(Continued)

*Primary Examiner*—Darren W Ark

(57) ABSTRACT

This waterfowl decoy kite is designed in a manner that allows for its deployment over a body of water or other potential waterfowl landing area to facilitate the attracting of specific species to the hunter. The kite is made from a an oval wing and circular stabilizer. The wing and stabilizer may have a variety of notches so as to impart bird like characteristics to the kites flight pattern and visual appeal. The kite may also be painted so as to exhibit a bird like appearance during flight.

21 Claims, 5 Drawing Sheets

U.S. PATENT DOCUMENTS

| | | | | |
|---|---|---|---|---|
| 3,079,115 A | * | 2/1963 | Edwards, Jr. et al. | 244/153 A |
| D196,738 S | * | 10/1963 | Palmer | D21/446 |
| 3,107,888 A | * | 10/1963 | Finn | 244/153 A |
| 3,110,460 A | * | 11/1963 | Koonce et al. | 244/153 R |
| 3,216,147 A | * | 11/1965 | Minera | 43/43.13 |
| 3,255,985 A | * | 6/1966 | Albertson, Jr. | 244/153 A |
| 3,358,399 A | * | 12/1967 | Waldmann | 43/4 |
| 3,435,550 A | * | 4/1969 | Carlson | 43/3 |
| 3,436,856 A | * | 4/1969 | Miller | 43/3 |
| 3,547,384 A | * | 12/1970 | Clark | 244/154 |
| 3,707,798 A | * | 1/1973 | Tryon | 43/3 |
| D232,572 S | * | 8/1974 | Torsak | D21/446 |
| 3,997,136 A | * | 12/1976 | Finn et al. | 244/153 A |
| 4,012,017 A | * | 3/1977 | Springston et al. | 244/153 A |
| 4,099,690 A | * | 7/1978 | Mendelsohn et al. | 244/153 R |
| 4,121,794 A | * | 10/1978 | Lemelson | 244/153 A |
| 4,129,274 A | * | 12/1978 | Baker | 244/155 R |
| 4,228,977 A | * | 10/1980 | Tanaka | 244/153 R |
| 4,243,190 A | * | 1/1981 | Sams | 244/153 A |
| 4,312,129 A | * | 1/1982 | Fergusson | 244/155 R |
| 4,389,032 A | * | 6/1983 | Meckley | 244/153 R |
| 4,606,518 A | * | 8/1986 | Jeffrey | 244/153 A |
| 4,669,684 A | * | 6/1987 | Vernelson et al. | 244/153 R |
| D291,459 S | * | 8/1987 | Ruggles | D21/446 |
| 4,779,825 A | * | 10/1988 | Sams | 244/153 A |
| 4,790,498 A | * | 12/1988 | Jeffrey | 244/153 A |
| 4,848,704 A | * | 7/1989 | Sams | 244/155 R |
| 4,911,384 A | * | 3/1990 | Stankus | 244/153 R |
| D315,750 S | * | 3/1991 | Hultgren et al. | D21/446 |
| 5,003,722 A | * | 4/1991 | Berkley et al. | 43/3 |
| D323,003 S | * | 1/1992 | Plischke | D21/446 |
| 5,352,144 A | * | 10/1994 | Kuhn | 244/153 R |
| 5,492,288 A | * | 2/1996 | Bordelon | 244/153 R |
| 5,524,851 A | * | 6/1996 | Huang | 244/153 R |
| 5,598,988 A | * | 2/1997 | Bukur | 244/153 A |
| 5,669,803 A | * | 9/1997 | Sweed | 244/154 |
| 5,682,702 A | * | 11/1997 | McKnight et al. | 43/3 |
| 5,833,174 A | * | 11/1998 | Knight et al. | 244/153 A |
| 5,954,297 A | * | 9/1999 | Bukur | 244/153 A |
| 6,044,581 A | * | 4/2000 | Shipman et al. | 43/3 |
| 6,095,458 A | * | 8/2000 | Cripe | 244/153 R |
| 6,283,413 B1 | * | 9/2001 | Bukur | 244/153 A |
| 6,349,902 B1 | * | 2/2002 | Cripe | 244/153 R |
| 6,357,160 B1 | * | 3/2002 | Hackman et al. | 43/2 |
| 6,449,894 B1 | * | 9/2002 | Price et al. | 43/3 |
| 6,640,483 B2 | * | 11/2003 | Nelson | 43/3 |
| 6,658,784 B1 | * | 12/2003 | Mastropaolo | 43/43.13 |
| 6,695,258 B1 | * | 2/2004 | Chang | 244/153 R |
| 6,722,077 B2 | * | 4/2004 | Heiges | 43/3 |
| 6,782,653 B1 | * | 8/2004 | Thomas | 43/3 |
| 6,807,765 B2 | * | 10/2004 | Watermann | 43/2 |
| 7,389,606 B2 | * | 6/2008 | McLeod | 43/2 |
| 2004/0237373 A1 | * | 12/2004 | Coleman | 43/3 |

FOREIGN PATENT DOCUMENTS

| | | | |
|---|---|---|---|
| FR | 2833574 A1 | * | 6/2003 |
| GB | 2037170 A | * | 7/1980 |

\* cited by examiner

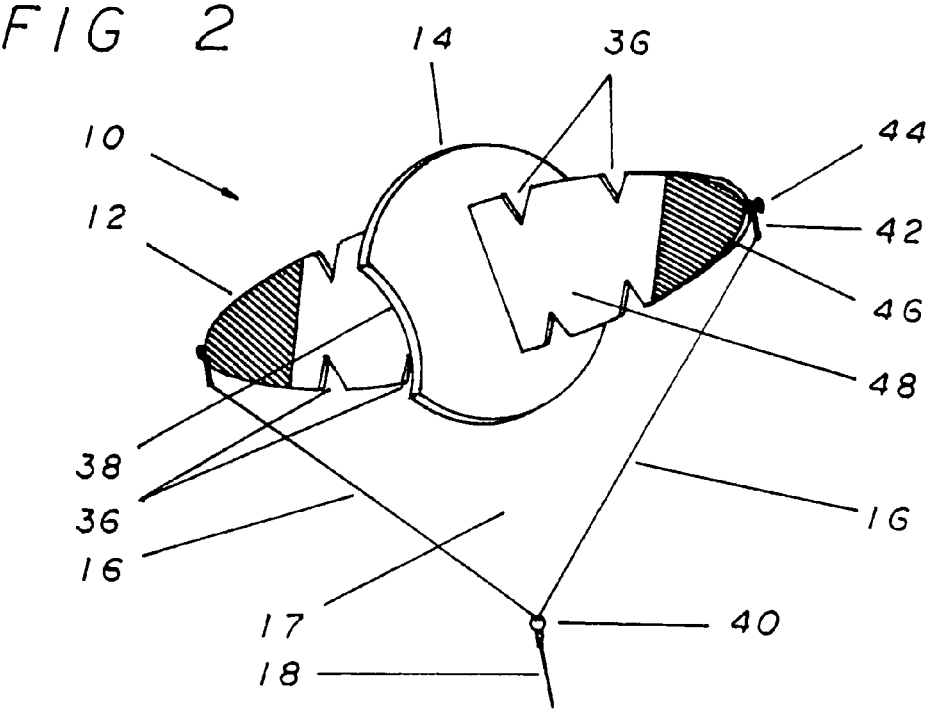
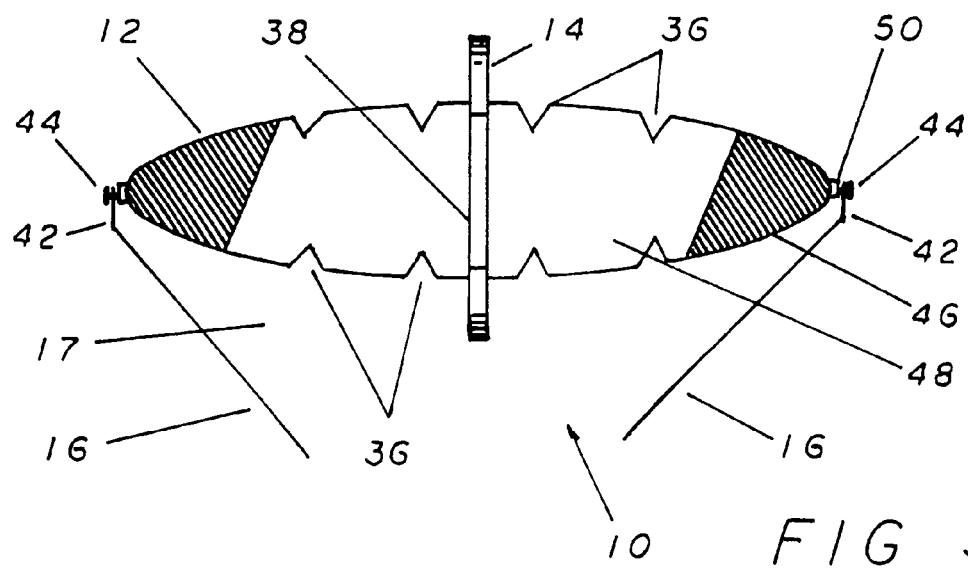

WATERFOWL DECOY KITE

BACKGROUND OF THE INVENTION

The present invention relates to an improvement in the methods used to attract waterfowl to a specific hunting site. More specifically, to the use of a spinning kite which has been specially designed in terms of its color schemes and flight characteristics so when it is properly deployed it mimics the desired species of waterfowl's flight patterns. This waterfowl decoy kite can then be deployed over the desired body of water by the use of a line and fishing pole.

Hunters have used decoys in their pursuit of waterfowl throughout history. Generally, this involves the placement of waterfowl decoys either on the surface of body of water or dispersed in an open field. The decoys used for this purpose are constructed in a manner so that they resemble the specific species of waterfowl that the hunter is pursuing thereby increasing the hunter's chances of attracting that species of waterfowl.

The placement of the decoys in this manner constructs an illusion that the area is populated with waterfowl on an identifiable species which in turn draws waterfowl of that species into the area. The hunter takes up a concealed position such as a hunting blind, a camouflaged boat, a stand of reeds or brush, or any other suitable position that is located adjacent to the deployed decoys. This method of hunting allows the hunter to take his quarry as they enter the kill zone to land among the decoys.

While this method of hunting waterfowl has proved to be successful over time, it has two related limitations, the decoys are too static and they do not mimic the flight characteristics of waterfowl. While the decoys are at least partially effective in their designed purpose, it has been understood for a long period of time that it would be beneficial to somehow provide a more dynamic lure. As a characteristic of their design, the decoys must be anchored in place thereby reducing their life-like appearance as a real flock of waterfowl is never stationary. Additionally, there has never been a way of accurately mimicking the flight characteristics of waterfowl to further enhance the overall effectiveness of deployed decoys.

Some attempts have been made to overcome these limitations of the current state of waterfowl decoys, but they are at best, cumbersome and ineffective. The most notable of these is a light weight replica of a specific water fowl that is designed to fly like a kite. The problems with this approach are many. Firstly, while it cannot be argued that the natural aerodynamic characteristics of birds in general, and waterfowl specifically, is a design that functions properly, this is only the case when the plethora of the involved control surfaces are operated and controlled independently. Attempting to control such a complex aerodynamic form by the use of a static replica and a single string is fool hardy at best.

Additionally, the cost of producing such waterfowl decoys is prohibitive. Not only is the intricate form difficult and expensive to produce, the fact that they are intended to exactly replicate individual species means that a hunter must purchase a variety of the decoys if he wishes to hunt more than one species of waterfowl. Finally, the flight characteristics of these decoys are not effective in their designed purposes. This is due to their limitations in design which result in unnatural flight patterns. Not only does this limit their effectiveness, but it also may actually deter the intended quarry from landing in the desired location as, despite their life-like physical appearance, their unnatural flight characteristics may provide clues to incoming waterfowl as to the artificial nature of the intended landing area.

Therefore, it can be seen from the forgoing discussion that it would be desirable to provide a controllable flying waterfowl decoy that accurately mimics the flight characteristics of the intended species and which does so in a manner that attracts the attention of that species thereby enticing them to land in the intended kill zone.

SUMMARY OF THE INVENTION

It is the primary objective of the present invention to provide a waterfowl decoy kite that is designed in a manner that allows it to be deployed over an intended kill zone by the use of a standard fishing pole and line.

It is an additional objective of the present invention to provide such a waterfowl decoy kite that is constructed with specially designed control surfaces which provide flight characteristics that mimic those of waterfowl.

It is a further objective of the present invention to provide such a waterfowl decoy kite that can be painted in specific patterns enabling it to more accurately replicate specific species of waterfowl.

It is a still further objective of the present invention to employ such a waterfowl decoy kite that can be produced in an inexpensive manner and is durable enough to withstand the rigors associated with waterfowl hunting.

These objectives are accomplished by the use of a waterfowl decoy kite which is based on the proven technology of rotating or spinning kites. Rotating or spinning kites are well known in the art and generally are made up of a wing element which is horizontally oriented along its longitudinal axis and a centrally located stabilizer element. The stabilizer is oriented vertically in relation to the wing element and bisects its horizontal plane.

The present invention is constructed of a light weight but durable plastic such as depron or expanded polypropylene. It has also been found that expanded polyethylene such as that made by ARPAK is ideal. The use of this material not only has benefits in the construction of the present invention as it is easily formed, but al so it is very light yet strong enough to withstand impact and other forces commonly encountered when flying any kite. Additionally, the use of this material provides cost benefits as it is relatively inexpensive allowing hunters to purchase a variety of differing designs of the present invention. This allows them to adjust their hunting techniques to fit varying conditions.

The outside ends of the wing element also provide for the rotational attachment of the two lead lines. The two lead lines extend out from this rotational attachment to a point where they join together and to the main line forming a yoke. This method of securing the present invention to the main line in a manner that allows it to spin freely between the rotational attachment of the lead lines. As the wing of the present invention catches the wind, it provides the lift necessary to get it airborne both through its shape and the spinning motion. Additionally, the vertical stabilizer functions much like the tail surface on an airplane to ensure that the invention remains stable in the in the horizontal plane in all wind conditions.

The present invention is also equipped with a plurality of features that help it perform the desired operation. The first of these is a plurality of rotational notches formed along the outside edges of the wing. These rotational notches interrupt the flow of air over the wing while the present invention is deployed which in turn alter the spinning characteristics of the wing. Generally, the use of the rotational notches slow the rotation of the wing when in flight. This has been found to enhance its effectiveness in attracting waterfowl into the kill zone. Additionally, during the manufacture of the present invention the size and number of the rotational notches can be varied to suit the specific characteristics of the desired waterfowl species or to adapt to varying weather and environmental conditions.

Another of the special features of the present invention are the flutter notches positioned on opposite sides of the stabilizer. The flutter notches operate to disrupt the air flow over the stabilizer in flight. The result of this is to create a side to side wobble in the flight pattern of the present invention. This has been found to enhance the effectiveness of the present invention as it results in a flight characteristic that more closely resembles that of the waterfowl. Additionally, the size and location of the flutter notches can be varied in much the same manner as discussed for the rotational notches to fit any given situation.

The present invention is also designed so that its color scheme can be tailored to mimic the plumage of any species of waterfowl. This feature further enhances the effectiveness of the present invention as it increases the odds of attracting the desired species of waterfowl into the kill zone.

Finally, an alternative embodiment of the stabilizer component of the present invention has also been contemplated in which its outside edges are constructed with a plurality of small flutter notches forming a serrated edge. This plurality of small flutter notches has been found to impart desirable characteristics to the flutter pattern of the present invention. The serrations on the stabilizer break up the clean edge so as to make the stabilizer appear more bird like, the serrations also aid the stabilizer in resisting side to side movements imparted by side winds, thereby increasing its overall effectiveness in its designed function.

For a better understanding of the present invention reference should be made to the drawings and the description in which there are illustrated and described preferred embodiments of the present invention.

DESCRIPTION OF THE DRAWINGS

FIG. 2 is a perspective view of the present invention illustrating the relationship between its wing element and its stabilizer element.

FIG. 3 is a front elevation view of the present invention of FIG. 2.

DESCRIPTION OF THE PREFERRED EMBODIMENT

Figure 1:
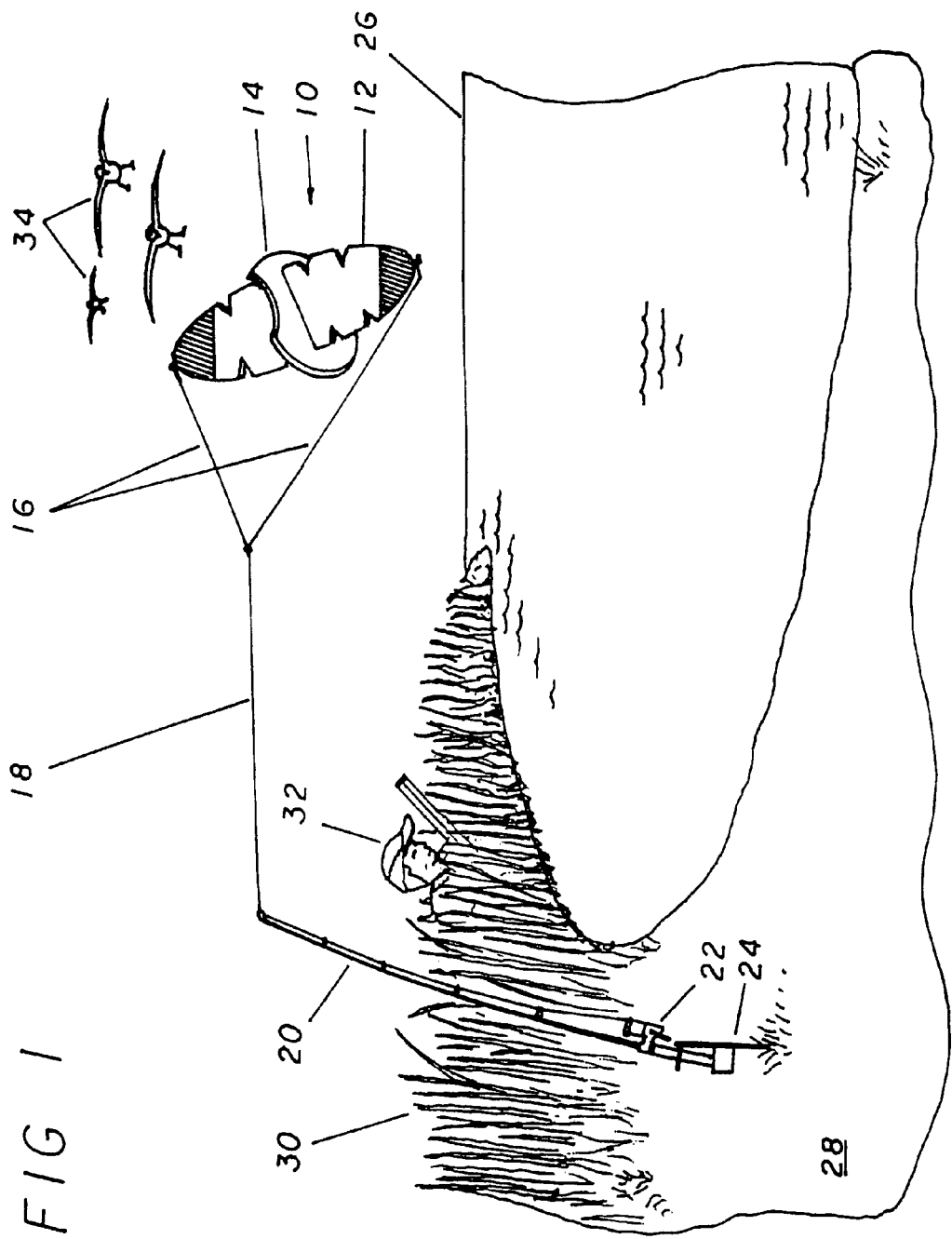
FIG. 1 is a pictorial view of a typical waterfowl hunting scene illustrating the manner in which the present invention is deployed to attack waterfowl into a specific location where the hunter is concealed.

Referring now to the drawings, and more specifically to FIG. 1, the waterfowl decoy kite 10 is typically deployed over a body of water 26 or other intended kill zone such as field of grain stubble. This deployment can be accomplished in any number of ways but it has been found that the use of a common fishing pole 20 is very effective for this purpose. The fishing pole 20 is anchored to the land 28 by the use of a pole stand 24. The pole stand 24 holds the fishing pole 20 in an upright manner so that the main line 18 can be positioned in the desired location. The main line 18 is attached at one end to the fishing reel 22 of the fishing pole 20 and to the lead lines 16 at the other. The lead lines 16 are in turn pivotally attached to the present invention.

The use of this system allows the present invention's position to be controlled with respect to the distance between it and the fishing pole 20 by either letting the main line 18 out or retracting it through the operation of the fishing reel 22. Additionally, the flex that is inherent in fishing poles 20 also enhances the flight characteristics of the present invention as it allows it to oscillate back and forth as the strength of the winds rises and falls. Finally, such use of the present invention allows the hunter 32 to conceal himself from incoming waterfowl 34 in a source of cover 30 that is adjacent to the intended killing zone.

Figure 4:
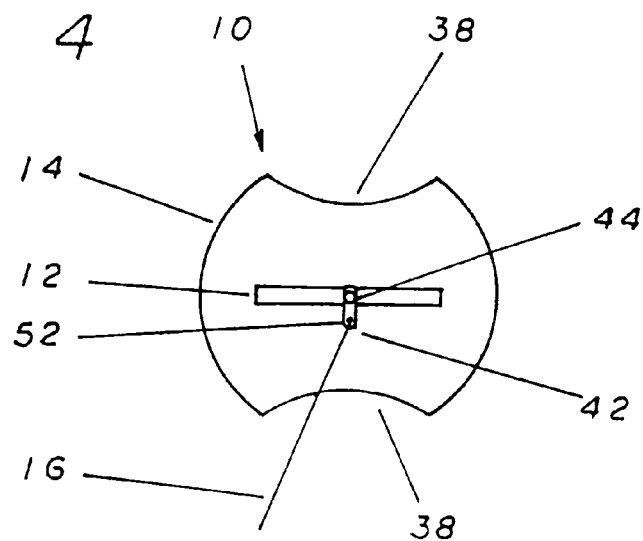
FIG. 4 is a side elevation view of the present invention of FIG. 2.

The general construction of the present invention is further detailed in FIGS. 2, 3, and 4. The present invention is constructed of a light weight but durable plastic such as depron, expanded polypropylene or expanded polyethylene. The use of this material not only has benefits in the construction of the present invention as it is easily formed, but also it is very light yet strong enough to withstand impact and other forces commonly encountered when flying any kite.

The present invention is generally made up of a wing 12 which is in turn horizontally oriented with reference to its central longitudinal axis. The wing 12 is the primary lift providing mechanism and also allows for the attachment of the stabilizer 14. The stabilizer 14 is a vertically oriented component with reference to the wing 12 and functions to provide the present invention with a degree of longitudinal stability during operation.

The present invention is secured to the main line 18 through the use of the two lead lines 16. The lead lines are rotationally attached to the present invention at either outside end of the wing 12 (the exact nature of these attachments will be detailed below). From these points of attachment, the two lead lines 16 converge to form a yoke 17 within which the present invention is mounted and which also allows for its free rotational ability. Also, at the point of convergence, the lead lines are attached to a line swivel 40 or other attachment device providing for their attachment to the main line 18. This secures the present invention to the fishing pole 20 and allows for its proper deployment and control in the desired area.

The wing of the present invention also provides for the placement of a plurality of rotation notches 36. The rotation notches 36 are illustrated in V-shaped cuts made into the leading edges of the wing 12. However, the size and shape of the rotation notches are not limited to those depicted in these FIGURES as their size and shape is dependent on the desired flight characteristics. Therefore, the rotation notches as illustrated should not be construed to limit their construction as shown, but are rather for purposes of illustration and simplicity.

The function of the rotation notches 36 is to alter the rotational characteristics of the present invention. The addition of the rotation notches alters the airflow over the wing 12 during operation. The primary effect of this is to slow the rotation of the wing 12 when the present invention is deployed for its intended use. The slowing of the rotation has been found to be desirable when these apparatuses are employed in a waterfowl decoy capacity. As stated earlier, the size, shape, and number of the rotation notches can be varied during the construction of the wing 12 to produce the desired characteristics.

The stabilizer 14 is also equipped with a feature that affects its flight characteristics, the flutter notches 38. The flutter notches 38 are larger, in relation to the rotation notches 36, indentations in the outer edge of the stabilizer 14. As illustrated, the flutter notches 38 are made up of a pair of concave indentations in the otherwise circular edge of the stabilizer 14. However, as with the rotation notches 36, their depicted size, shape, and number should not be construed as being limited to the illustrations, but rather are depicted as such for illustrative purposes only.

The placement of the flutter notches 38 in the outer edge of the stabilizer 14 results in the disruption of the airflow over it. This disruption then causes the stabilizer 14 and thus, the present invention itself, to oscillate back and forth along the longitudinal axis of the wing 12. This oscillation enhances the performance of the present invention as it results in a more life-like appearance thereby attracting more of the intended species of waterfowl 34.

The wing 12 and stabilizer 14 are also colored to mimic the plumage of the desired species of waterfowl 34. In the illustrated case, the intended species is snow geese which generally have a white body with black wingtips. Accordingly, this example of the present invention is colored so that the stabilizer 14 and central portion of the wing 12 are of a white coloration 46 and the outside tips of the wing 12 are of a black coloration 48. This color scheme results in a decoy that is especially attractive to snow geese and so is ideal for use when hunting that species. The color scheme used to decorate the present invention can be altered to mimic any species of waterfowl 34 thereby allowing for its effective use in almost any hunting circumstance.

Figure 5:
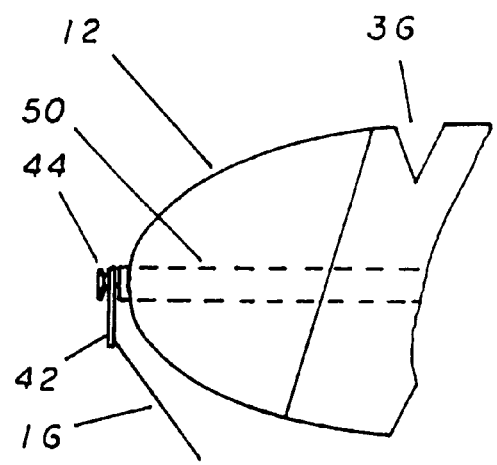
FIG. 5 is a front elevation view of a distal portion of a wing element of the present invention illustrating the method employed to rotationally attach it to the lead line.
Figure 6:
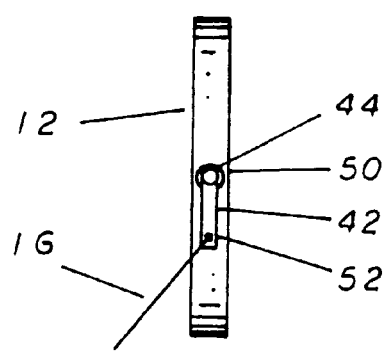
FIG. 6 is a side elevation view of the wing element of the present invention of FIG. 5.
Figure 7:
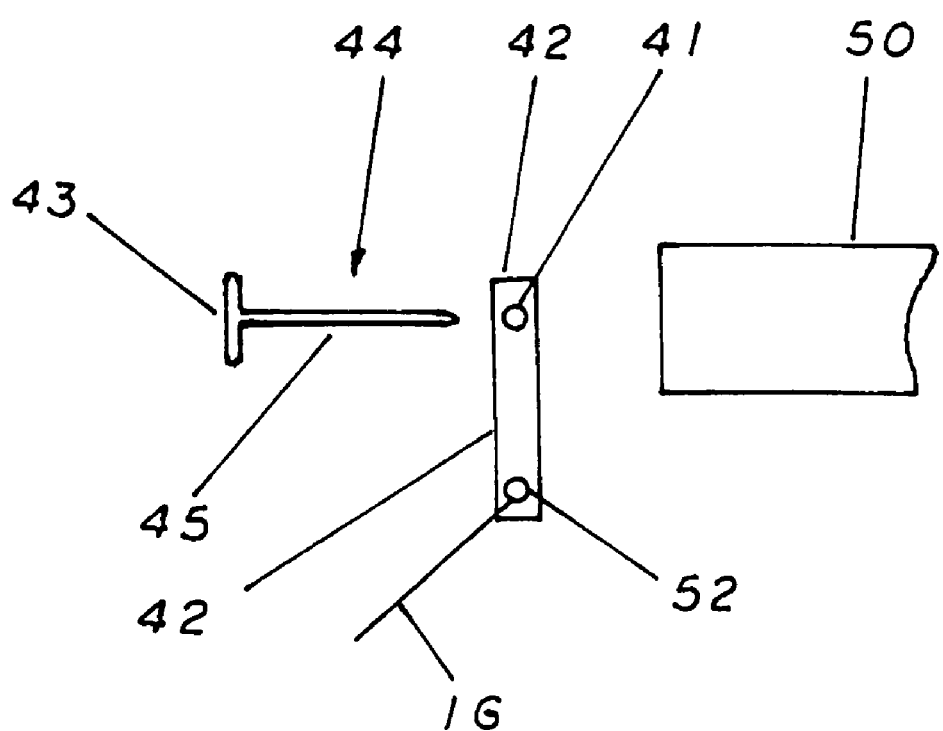
FIG. 7 is a close up view of the attachment assembly component of the present invention illustrating its general manner of construction.

The nature of the pivotal attachment of the lead lines 16 to the wing 12 is further illustrated in FIGS. 5, 6, and 7. The first component of the attachment system is a central dowel 50 that passes through the longitudinal center of the wing 12. The central dowel 50 serves two functions. The first of these to provide a greater degree of structural rigidity to the wing 12. The added structural rigidity helps the wing 12 withstand the forces placed on it during the operation of the present invention. The central dowel 50 is generally made of wood but it can be formed from any other suitable material such as metal or plastic so long as it provides the desired rigidity to the present invention.

The second function of the central dowel 50 is to provide a place to secure the other attachment components. In this, the outer ends of the central dowel 50 extend beyond the outside edges of the wing 12. This then allows for the insertion of the attachment pins 44 and the attachment bracket 42. The attachment bracket is a small rectangular piece of a lightweight metal or other similar material that has a hole at either end. The first of these is the attachment pin hole 41 that facilitates the pivotal attachment of the attachment bracket 42 to the central dowel 50. The attachment pin 44 is a nail-like apparatus having an elongated pin shaft 45 and a flattened attachment pin head 43. Additionally, the outside diameter of the pin shaft 45 is smaller than the inside diameter of the attachment pin hole 41 through which it passes.

The attachment is accomplished by passing the pin shaft 45 of the attachment pin 44 through the attachment pin hole 41 and driving it into the central dowel 50. This allows the attachment bracket 42 to freely rotate around the attachment pin 44 while being retained by the flattened attachment pin head 43 which ensures that the attachment bracket 42 cannot slip off the end of the attachment pin 44.

The other end of the attachment bracket 42 contains the line attachment hole 52. The line attachment hole 52 allows for the fixing of the lead lines 16 to the attachment bracket 42. This attachment can be accomplished in any number of ways including a simple knot. The use of the attachment bracket 42 and its rotational attachment to the central dowel 50 allows the present invention to freely spin within the yoke 17 created by the configuration of the lead lines 16. The spinning motion and the operations of the rotation and flutter notches, 36 and 38, of the present invention not only allow it to fly, but also create the waterfowl 34 attracting qualities that are central to its designed operation.

Figure 8:
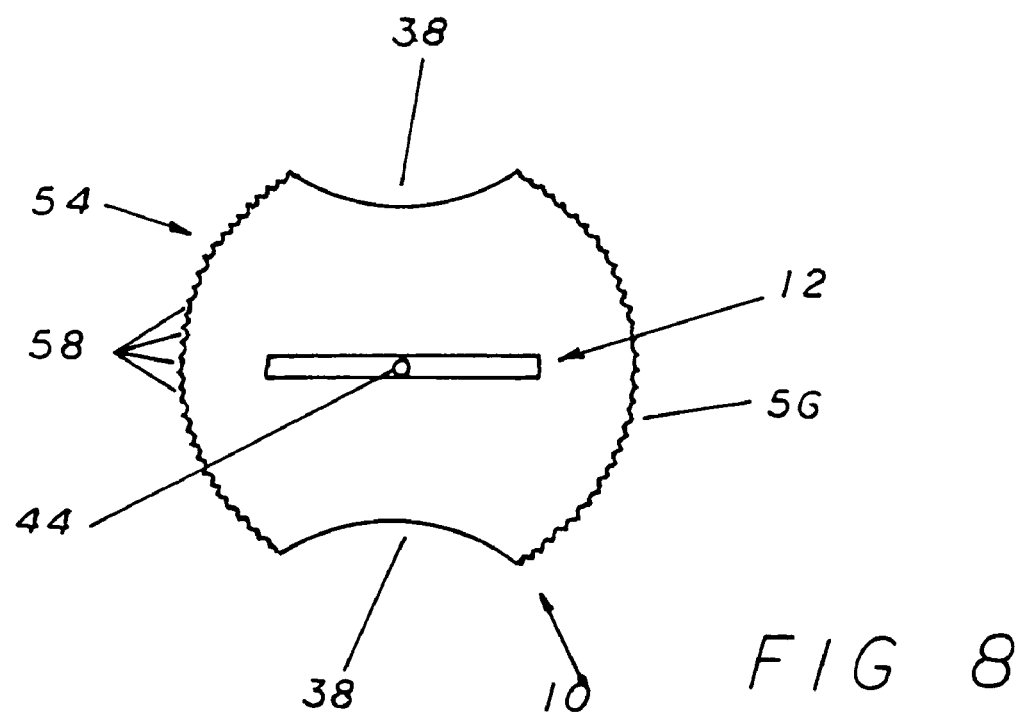
FIG. 8 is a side elevation view of the present invention illustrating an alternative embodiment of its stabilizer component.

Finally, an alternative embodiment of the stabilizer 14 component of the present invention has also been contemplated and is illustrated in FIG. 8. This embodiment of the stabilizer 14 is referred to as the serrated stabilizer 54 and differs in the fact that it is constructed with a plurality of small flutter notches 58 forming a serrated edge 56. This incorporation of this plurality of small flutter notches 58 has been found to impart desirable characteristics to the flutter pattern of the present invention by making the invention appear more bird like in its movements and aiding the stabilizer 14 in resist side to side movement imparted by side winds, thereby increasing its overall effectiveness in its designed function.

Although the present invention has been described in considerable detail with reference to certain preferred versions thereof, other versions are possible. Therefore, the spirit and scope of the appended claims should not be limited to the description of the preferred versions contained herein.

What is claimed:

1. A waterfowl decoy kite for attracting waterfowl, comprising:
    a stabilizer having a left side, a right side and an outer edge defining an outermost extent of said stabilizer;
    wherein said outer edge is comprised of a serrated edge having a plurality of first flutter notches extending into said outer edge;
    a second flutter notch extending into said outer edge of said stabilizer, wherein said second flutter notch is larger in size than each of said plurality of first flutter notches;
    a wing attached to said stabilizer, wherein said stabilizer is substantially vertically orientated and wherein said wing is substantially horizontally orientated;
    a left lead line connected to a left end of said wing and a right lead line connected to a right end of said wing, wherein said wing rotates between said left lead line and said right lead line;
    wherein said stabilizer and said wing are comprised of a foam material; and
    wherein said stabilizer and said wing are painted to imitate the color of waterfowl.

2. The waterfowl decoy kit of claim 1, wherein said stabilizer and said wing are comprised of a plastic material, an expanded polypropylene material or an expanded polyethylene material.

3. The waterfowl decoy kit of claim 1, wherein said first flutter notches are V-shaped.

4. The waterfowl decoy kit of claim 1, wherein said second flutter notch is curved shaped.

5. The waterfowl decoy kit of claim 4, wherein said first flutter notches are V-shaped.

6. The waterfowl decoy kit of claim 1, wherein distal portions of said wing are painted a different color than a central portion of said wing.

7. The waterfowl decoy kit of claim 1, wherein said wing is comprised of a unitary structure.

8. The waterfowl decoy kit of claim 1, including a third flutter notch extending into said stabilizer opposite of said second flutter notch.

9. The waterfowl decoy kit of claim 8, wherein said third flutter notch has a shape and size substantially similar to said second flutter notch.

10. A waterfowl decoy kite for attracting waterfowl, comprising:

a stabilizer having a left side, a right side and an outer edge defining an outermost extent of said stabilizer;

wherein said outer edge is comprised of a serrated edge having a plurality of first flutter notches extending into said outer edge;

a second flutter notch extending into said outer edge of said stabilizer, wherein said second flutter notch is larger in size than each of said plurality of first flutter notches;

a wing attached to said stabilizer, wherein said stabilizer is substantially vertically orientated and wherein said wing is substantially horizontally orientated;

a plurality of rotation notches within a perimeter of said wing;

a left lead line connected to a left end of said wing and a right lead line connected to a right end of said wing, wherein said wing rotates between said left lead line and said right lead line;

wherein said stabilizer and said wing are comprised of a foam material; and wherein said stabilizer and said wing are painted to imitate the color of waterfowl.

11. The waterfowl decoy kit of claim 10, wherein said stabilizer and said wing are comprised of a plastic material, an expanded polypropylene material or an expanded polyethylene material.

12. The waterfowl decoy kit of claim 10, wherein said first flutter notches are V-shaped.

13. The waterfowl decoy kit of claim 10, wherein said second flutter notch is curved shaped.

14. The waterfowl decoy kit of claim 13, wherein said first flutter notches are V-shaped.

15. The waterfowl decoy kit of claim 10, wherein distal portions of said wing are painted a different color than a central portion of said wing.

16. The waterfowl decoy kit of claim 10, wherein said wing is comprised of a unitary structure.

17. The waterfowl decoy kit of claim 10, including a third flutter notch extending into said stabilizer opposite of said second flutter notch.

18. The waterfowl decoy kit of claim 17, wherein said third flutter notch has a shape and size substantially similar to said second flutter notch.

19. The waterfowl decoy kit of claim 18, wherein said second flutter notch and said third flutter notch are curved shaped.

20. The waterfowl decoy kit of claim 10, wherein said wing is painted to include at least one color not present within said stabilizer.

21. A method of utilizing a waterfowl decoy kite for attracting waterfowl, comprising:

identifying a hunting location for waterfowl;

providing a waterfowl decoy kite, wherein said waterfowl decoy kite comprises a stabilizer having a left side, a right side and an outer edge defining an outermost extent of said stabilizer, wherein said outer edge is comprised of a serrated edge having a plurality of first flutter notches extending into said outer edge, a second flutter notch extending into said outer edge of said stabilizer, wherein said second flutter notch is larger in size than each of said plurality of first flutter notches, a wing attached to said stabilizer, wherein said stabilizer is substantially vertically orientated and wherein said wing is substantially horizontally orientated, a plurality of rotation notches within a perimeter of said wing, a left lead line connected to a left end of said wing, a right lead line connected to a right end of said wing, wherein said wing rotates between said left lead line and said right lead line, a main lead line connected to said left lead line and said right lead line, wherein said stabilizer and said wing are comprised of a foam material, and wherein said stabilizer and said wing are painted to imitate the color of waterfowl;

flying said waterfowl decoy kite above a ground surface within said hunting location; and concealing a hunter from incoming waterfowl in a source of cover that is adjacent to said waterfowl decoy kite.

* * * * *